United States Patent [19]
Gross

[11] Patent Number: 5,506,386
[45] Date of Patent: Apr. 9, 1996

[54] SIMULTANEOUS TEMPERATURE MEASUREMENTS ON LASER WELDED SEAMS WITH AT LEAST TWO PYROMETERS IN RELATION TO MONITORING PROCESS PARAMETERS AND WELD QUALITY

[75] Inventor: Norbert Gross, Zürich, Switzerland

[73] Assignee: Elpatronic AG, Zug, Switzerland

[21] Appl. No.: 339,010

[22] Filed: Nov. 14, 1994

[30]     Foreign Application Priority Data

Nov. 30, 1993 [CH] Switzerland ............... 03 562/93
Oct. 3, 1994 [CH] Switzerland ............... 02 975/94

[51] Int. Cl.$^6$ ............................................. B23K 26/00
[52] U.S. Cl. ...................... 219/121.64; 219/121.63; 219/121.83; 219/137 R
[58] Field of Search ............... 219/121.63, 121.64, 219/121.83, 121.85, 121.62, 137 R

[56]         References Cited

U.S. PATENT DOCUMENTS

| | | |
|---|---|---|
| 3,555,239 | 1/1971 | Kerth ........................ 219/125 |
| 4,317,981 | 3/1982 | Chubarov et al. ............... 219/121 EA |
| 4,359,622 | 11/1982 | Dostoomian et al. ............... 219/110 |
| 4,649,256 | 3/1987 | Miranida et al. ............... 219/121 LD |
| 4,663,513 | 5/1987 | Webber . | |
| 4,717,801 | 1/1988 | Brolin et al. ............... 219/9.5 |

FOREIGN PATENT DOCUMENTS

| | | |
|---|---|---|
| 0452138 | 10/1991 | European Pat. Off. . |
| 0562492 | 9/1993 | European Pat. Off. . |
| 4027714 | 3/1992 | Germany . |

OTHER PUBLICATIONS

Japanese Patent Abstract, vol. 13, No. 48 (M-793) Feb. 3, 1989 & FP-A-63 256 289 (Matsushita Electric Ind Co.) Oct. 24, 1988.

Primary Examiner—Mark H. Paschall
Attorney, Agent, or Firm—McCormick, Paulding & Huber

[57]         ABSTRACT

In laser butt welding of metal sheets, in particular sheets of unequal thicknesses, the temperature is measured at two points behind the liquid-solid interface. From combination of the two readings obtained a series of process data can be derived whereby the welding process can be monitored.

12 Claims, 1 Drawing Sheet

SIMULTANEOUS TEMPERATURE MEASUREMENTS ON LASER WELDED SEAMS WITH AT LEAST TWO PYROMETERS IN RELATION TO MONITORING PROCESS PARAMETERS AND WELD QUALITY

BACKGROUND OF THE INVENTION

The invention relates to a method of process monitoring and quality control for laser welded butt joints, especially in thin sheet metal. The invention also relates to an apparatus for carrying out the method. Characteristic process-sensitive data are obtained by means of pyrometric temperature measurements and are evaluated for quality control. By setting tolerance limits, the quality of the weld can be assured within a predetermined framework.

In recent times, the possibility of using a temperature value immediately behind the liquid-solid interface of the weld for the purpose of process monitoring has been recognized, and a relationship has been established between the measured temperature value and process parameters such as laser power output or working gas throughput (U.S. Pat. No. 4,663,513). The drawback of this method is that important parameters have to be assumed constant and changes in these parameters greatly distort the measurements obtained. For example, if there is just a slight dislocation of the beam, it is no longer possible to obtain a clear correlation between the measured values and the process parameters. Since, in principle, the behaviour of only one parameter can be evaluated by this method in relation to the change in temperature caused by that parameter, the method cannot be used as documentable evidence of weld quality.

For laser welding, coupled pyrometric measurements have hitherto been used only for research and parameter optimization. A known application for production utilizes an array of pyrodetectors which are all trained on the point of impingement of the laser and whose signals are electronically averaged in order to generate more reliable mean surface temperatures, particularly where relatively large surface areas are being treated (EP 0562492).

In modern industrial processes for the production of laser welded panels for motor vehicles, "tailored blanks", that is to say pre-cut flat sheets with dissimilar thicknesses and material properties, are butt welded together. In the cooling zone after the liquid-solid interface, a temperature distribution develops which is normally asymmetrical about the weld centreline and which is typical for the rate of travel, energy input, and pairing of materials. Evaluating the temperature recorded at only one spot does not afford a clear correlation with process parameters.

In principle, thermographic image analyses provide a solution to the problem. Image processing can greatly simplify and shorten the operations of calibration and setting of the pyrometer arrangement for new combinations of materials. By filtering the data obtained from thermograms, the described pyrometer arrangement can be fully simulated and signals identical to those obtained with this arrangement can be fed to the connected instrument chain for evaluation. Also, by using known algorithms, further inferences can be drawn as to weld quality from the additional information obtained. Production and filing of reference thermograms is advantageous here, and the build-up of self-learning systems is an obvious choice.

However, the use of this method on-line requires undesirably longcomputing times and is over-elaborate since only a small part of the information obtained is actually needed for process monitoring. Another obstacle is the high cost of commercial implementation.

Hence it is the fundamental object of the invention to provide a method whereby several relevant process parameters can be recorded in a manner which is simple and suitable for industrial application.

It has been found that by taking temperature measurements at at least two defined points it is possible to establish the link with the process parameters and to make the process transparent. This is done by aiming preferably high-speed pyrodetectors at defined points on either side of the seam immediately behind the liquid-solid interface of the weld metal. An individual measurement spot will typically contain an area of approx. 1 $mm^2$.

The signals from the individual pyrometers are linked together by electronic signal-processing. Logical operations such as addition, subtraction or division are available as standard routines.

DESCRIPTION OF THE PREFERRED EMBODIMENTS

Figure 1:
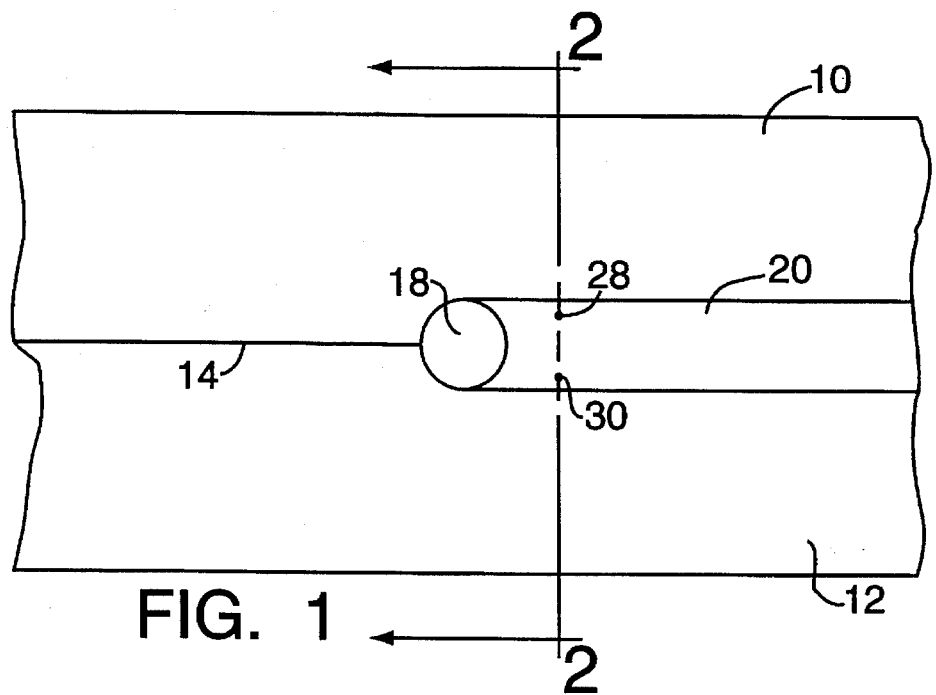
FIG. 1 is a plan top view of the laser weld monitoring process of the present invention.
Figure 2:
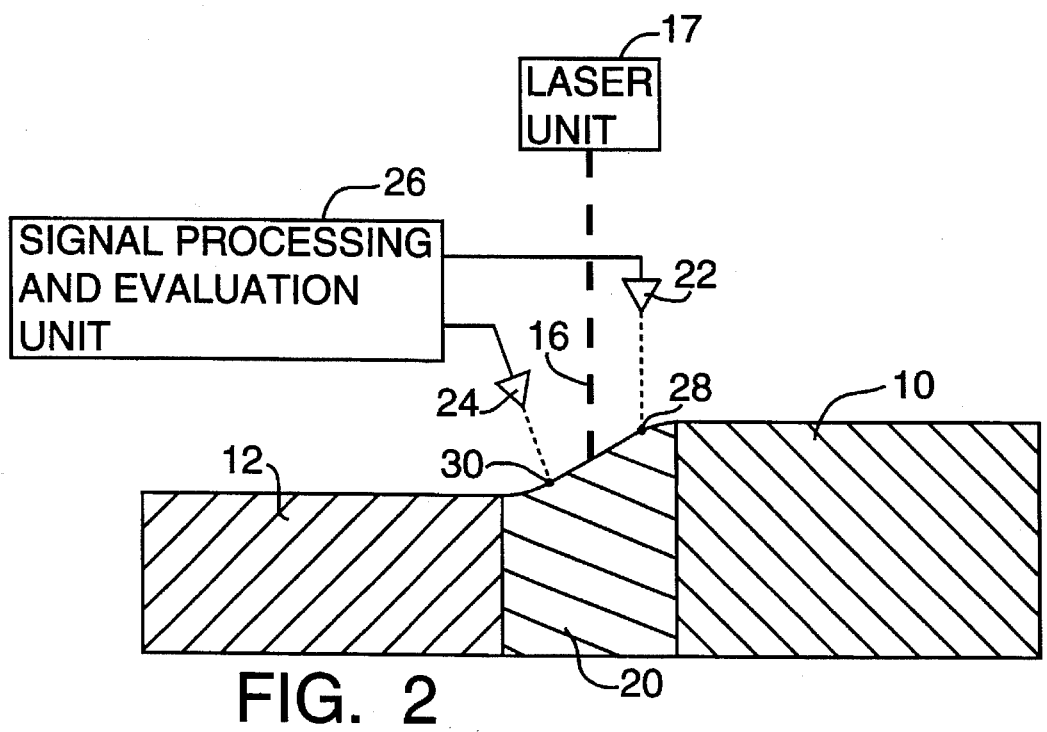
FIG. 2 is a cross sectional view taken along the line 2—2 in FIG. 1.

FIGS. 1 and 2 illustrate a process of butt welding two metal sheets 10 and 12 along a joint 14 by means of a laser beam 16 from a laser unit 17. The metal sheet 10 is thicker than the metal sheet 12 as shown in FIG. 2. At the welding point the laser beam develops a molten weld zone 18 leaving a liquid-solid interface with the adjacent sheet material. As the beam and weld zone move to the left in FIG. 1 along the butted edges of the sheets, the weld seam 20 forms immediately behind the zone.

The laser welding process is monitored by two high speed pyrodetectors 22 and 24 aimed at defined points 28 and 30 located behind the weld zone 18 on opposite sides of the centerline of the weld seam 20. The measuring points may be located symmetrically or asymmetrically from the weld seam centerline and at equal or unequal distances from the weld point. The size of each measuring point may range between 0.5 to 5 mm, but preferably is 1 mm or has an area of approximately 1 $mm^2$.

Signals from each pyrodetector representing the temperature measurements are transmitted to an electronic signal processing and evaluation unit 26 for interpretation and correlation with the welding process parameters. The signal processing may include combining the signals by addition, subtraction or division.

For the construction of a comprehensive on-line monitoring system, it is convenient to use the standard readings from the laser unit. Again by logical combination, parameters to be quantified can be clearly identified. For example, it has not hitherto been possible to tell from a temperature measurement whether a change in the power output of the laser or a variation in the width of the joint gap has occurred.

However, since in practice every laser has a continuous power measurement facility, a comparison of the measured values can establish a clear relation between temperature variations and variations in the width of the gap. The same principle applies to all process parameters which are detected by a physically separate method.

The important variables in laser welding are:

Laser parameters: beam power, beam diameter, mode, divergence, etc.

Process parameters: rate of travel, beam position, gas feed, etc.

Material parameters: geometry, thermal conductivity, reflective properties, etc.

In practical applications many of these variables remain constant; for example, when welding with a fixed lens system, the beam diameter, mode and divergence do not vary. For the remaining variables also, such as power, rate of travel and beam position, the aim is to achieve constancy in order to increase the reliability of the process. However, because these parameters may vary in the process, with considerable effects on weld quality, monitoring these is of great importance.

The behaviour of some parameters in the process will now be described in relation to their accessibility to control measurements as intended by the invention.

1. Laser power

The optical power generated in the laser can be measured calorimetrically directly at the resonator (end mirror) with repetition rates in the Hertz range. If temperature measurements at the surface of the workpiece are intended to serve as an indication of changes in the beam power output, losses due to equipment (beam guidance) and process (reflected and permeating components of the beam) must be deducted, as only the power which is converted into heat is detected in this way. Rapid fluctuations in power output cannot be detected by these temperature measurements, owing to attenuation and equalization phenomena.

In straight seam welding with process parameters constant (with no variations in power output or rate of travel), a quasi-static temperature field is developed around the weld point. Within this field it is possible to identify zones allowing continuous temperature measurement. On the one hand, such a measurement zone should not be so close to the liquid-solid interface that an unduly steep temperature gradient occurs within the measurement spot; on the other hand, it should not be so far away from the weld metal that a substantial equalization of temperature has been able to take place. The position of this measurement zone can be defined in relation to the weld point, taking account of variations in sheet metal thickness or process data.

A quasi-static temperature field will occur even when welding sheets of dissimilar thicknesses and materials, although in this case an asymmetrical heat-distribution is produced. Interpretation of a single temperature measurement is no longer practicable in this case, since even the smallest changes in the beam position cause considerable variations in the signals, and hence misinterpretations. A much more reliable indication of power output can be obtained by using two measurements taken a short distance on either side of the weld centreline.

It is advantageous when measuring two temperatures simultaneously to sum the signals so that the measuring sensitivity is enhanced by the increased signal spacing. Accordingly, when evaluating a change in power output in the measured-data interpretation, a check should first be made whether a simultaneous temperature-change of similar sign is occurring, after which the signal-sum can be scaled and compared with the measured value derived from the laser power reading.

2. Width of gap

Especially when extended seams are being welded, butt joints may have excessive gaps due to e.g. poor edge quality or faulty clamping. After welding, there is a noticeable sag of the weld at these locations and this impairs the weld quality. Part of the laser beam passes through the gap without contributing to the melting of the weld metal, and the spread of the temperature field decreases as a result. The recorded temperature curves are similar to those resulting from a drop in power. Here again the significance of the pyrometric measurements is revealed only by comparison with other measured process data. Hence a gap is identifiable and quantifiable as such when falling temperature curves are detected, if process data (power, rate of travel, plasma behaviour) are otherwise constant.

3. Beam position

In the event of even a small drift of the beam position away from the weld line, there may be a lack of fusion which is not accessible to visual inspection. Interpretation of temperature measurements on either side of the weld line yields a sensitive method for monitoring, and if necessary correcting, the offset of the beam. When similar components are welded, the curve derived from differential comparison of the pyrometer signals is directly proportional to the beam-offset at right angles to the axis of the weld; when dissimilar sheets are welded, preliminary calibration of the temperature curves is necessary.

4. Weld defects

Because of the small distance from the weld point, weld defects of a nonlinear type due to e.g. plasma breaks or undercuts can also be detected. One important advantage of using the method according to the invention which has been described is that possible flaws in the welded component itself are detected. This provides an aid to the evaluation of various systems for process monitoring, which can be checked as to their relevance to the assessment of weld quality.

I claim:

1. Method for process monitoring and/or quality control in laser butt welding of metal sheets of different thicknesses comprising the steps of:

measuring the temperature of the workpieces at two points located behind the weld zone on opposite sides of a weld seam centerline; and combining the measured temperature values to generate a single value as an indicator for the welding process.

2. Method according to claim 1, wherein the step of combining the measured temperature values includes adding the values.

3. Method according to claim 1, wherein the step of combining the measured temperature values includes subtracting the values from one another.

4. Method according to claim 1, characterized in that the two temperature measurements are taken immediately behind the liquid-solid interface of the weld zone.

5. Method according to claim 1, characterized in that the temperature measurements are taken symmetrically with respect to the weld seam centerline.

6. Method according to claim 1, characterized in that the temperature measurements are taken asymmetrically with respect to the weld seam centerline.

7. Method according to claim 1, characterized in .that the two temperature measurements are taken at equal distances from the weld point, or at unequal distances from the weld point.

8. Method according to claim 1, characterized in that each of the measurement spots has a diameter of approx. 0.5 to 5 mm.

9. Method according to claim 1, characterized in that the temperature readings are combined with, or compared with, laser power output readings.

10. Method according to claim 1, characterized in that the two temperature measurements are taken at unequal distances from the weld point.

11. Method according to claim 1, characterized in that each of the measurement spots has a diameter of approximately 1 mm, or that it has an area of approximately 1 mm$^2$.

12. Laser welding apparatus for monitoring laser butt welding of two metal sheets of different thicknesses, characterized by at least two pyrometers for temperature measurement of the metal sheets at two points located behind the weld zone on opposite sides of the weld seam centerline and a signal evaluation unit for correlating the temperature measurements as indicators of the welding process.

* * * * *